(12) United States Patent
Carlson et al.

(10) Patent No.: US 6,583,789 B1
(45) Date of Patent: Jun. 24, 2003

(54) METHOD AND SYSTEM FOR PROCESSING GLYPH-BASED QUALITY VARIABILITY REQUESTS

(75) Inventors: Michael Pierre Carlson, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,972

(22) Filed: Dec. 3, 1998

(51) Int. Cl.[7] .......................... G06T 11/00; G06E 15/00
(52) U.S. Cl. ...................... 345/471; 345/469; 345/470; 345/472; 358/1.11; 358/1.9
(58) Field of Search ................... 358/1.11, 1.9; 345/469–472

(56) References Cited

U.S. PATENT DOCUMENTS

| | | | | |
|---|---|---|---|---|
| 5,325,479 A | * | 6/1994 | Kaasila | 345/469 |
| 5,586,241 A | * | 12/1996 | Bauermeister et al. | 345/467 |
| 5,764,235 A | * | 6/1998 | Hunt et al. | 345/428 |
| 5,909,223 A | * | 6/1999 | Dowdy et al. | 345/467 |
| 6,138,127 A | * | 10/2000 | Pasch | 707/206 |
| 6,138,137 A | * | 10/2000 | Meeker et al. | 708/653 |
| 6,138,237 A | * | 10/2000 | Ruben et al. | 713/200 |
| 6,157,378 A | * | 12/2000 | Bormann et al. | 345/733 |
| 6,356,268 B1 | * | 3/2002 | Beaman et al. | 345/467 |
| 6,369,902 B1 | * | 4/2002 | Beaman et al. | 358/1.11 |
| 6,404,435 B1 | * | 6/2002 | Miller et al. | 345/468 |

* cited by examiner

Primary Examiner—Matthew C. Bella
Assistant Examiner—Anthony Blackman
(74) Attorney, Agent, or Firm—Duke W. Yee; David A. Mims, Jr.; Stephen R. Tkacs

(57) ABSTRACT

A user of a data processing system may specify variability in the generation of data for data-presentation, either by displaying or printing, on an output device. The variability specification may be applied on a glyph-by-glyph basis to the presentation of glyphs. The data processing system provides processing of glyph-based quality variability requests in the following manner. The system receives a request for data-presentation of a series of glyphs and determines, for each glyph in the series of glyphs, whether quality variability is applicable to each glyph. If quality variability is applicable to each glyph, then the system determines a quality variance to be applied to each glyph according to predetermined data-presentation variability data and performs data-presentation of each glyph on an output device in accordance with the quality variance. By providing quality variability on a glyph-by-glyph basis, a relatively simple glyph, such as those used for Latin characters, may be presented using low quality. However, a more complex glyph which may require a clear presentation of its more intricate detail for a proper comprehension of the glyph, such as various Chinese characters, are presented using high quality. In this manner, computing resources may be preserved or tailored on a glyph-by-glyph basis.

66 Claims, 11 Drawing Sheets

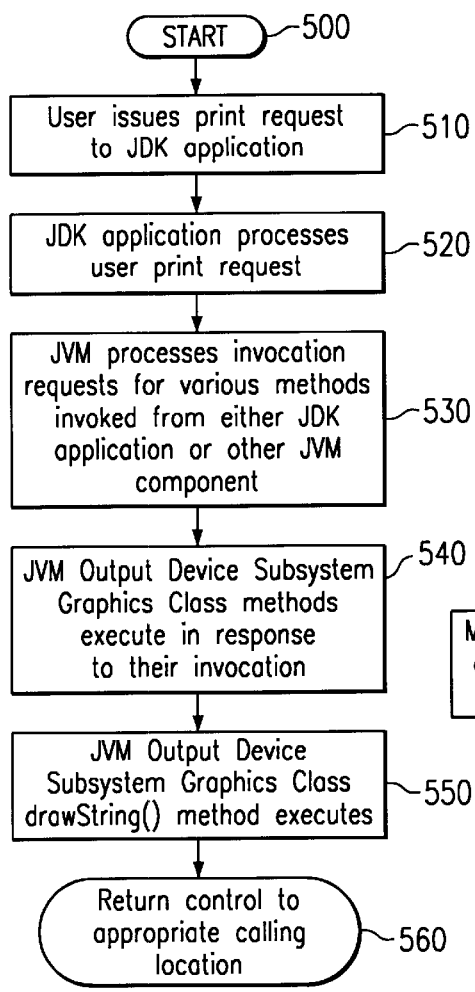
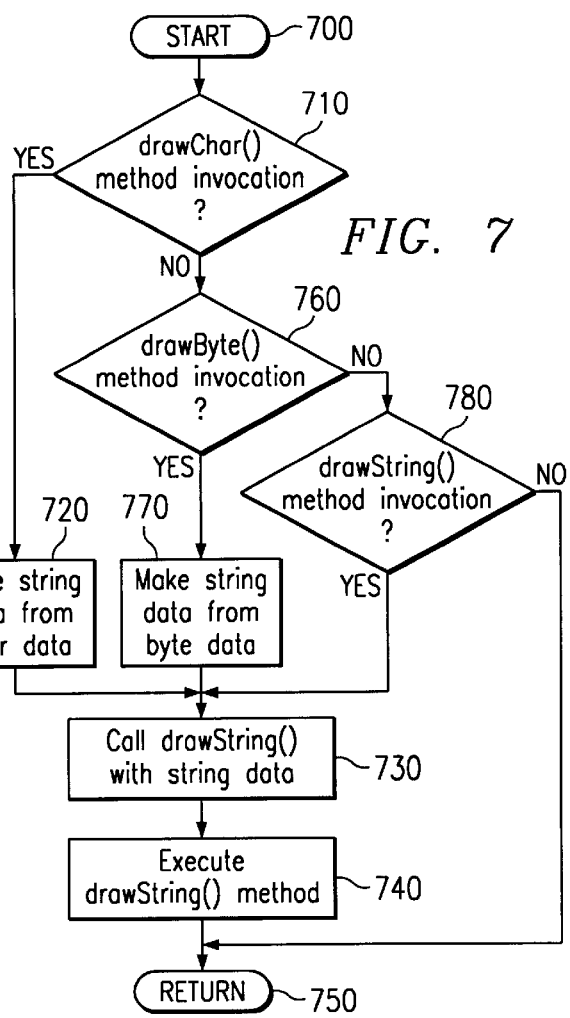
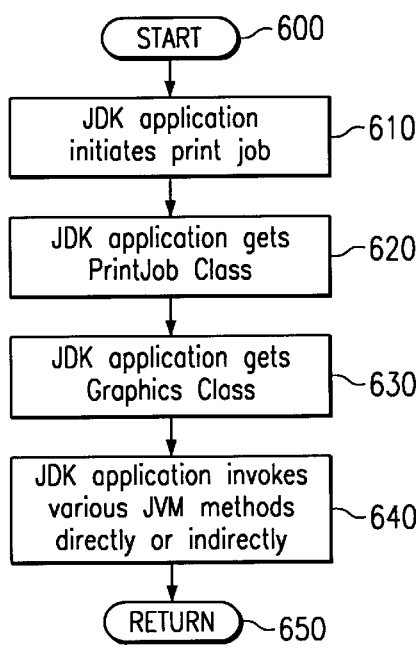

Direct invocation of drawString() call--
Example of pseudocode of Java application 1st:   PrintJob xyzPrintJob = Toolkit.getPrintJob();

Page One
2nd:   Graphics xyzGraphics = xyzPrintJob.getGraphics();
3rd:   xyzGraphics.drawchars();
       xyzGraphics.drawString();
       xyzGraphics.drawBytes();
4th:   xyzGraphics.dispose();

Page Two
repeat above

Page N
repeat above

4th:   xyzPrintJob.end().

*FIG. 17*

Indirect invocation of drawString()--
Example of psuedocode for Java application
which prints each component separately 1st:   PrintJob xyzPrintJob = Toolkit.getPrintJob();

Page One
       For 1st AWT component within a single page:
2nd:       Graphics xyzGraphics = xyzPrintJob.getGraphics();
3rd:       ScrollPane xyzScrollPane = java.awt.ScrollPane();
           // Create AWT component which is to be used for print and display purposes.//
4th:       xyzScrollPane.printComponent(xyzGraphics);
           xyzScrollPane.print(xyzGraphics);
           //print () can be implemented for printed output to differ from displayed output.//
5th:       xyzGraphics.dispose();

For 2nd AWT component within a single page
       repeat above

Page Two
repeat above

Page N
repeat above

6th:   xyzPrintJob.end().

*FIG. 18*

Indirect invocation of drawString()--
Example of psuedocode for Java application
which prints multiple component objects at once

FIG. 19

```
1st:    PrintJob xyzPrintJob = Toolkit.getPrintJob();

Page One
    For N AWT components within a single page
2nd:        Graphics xyzGraphics = xyzPrintJob.getGraphics();
3rd:        ScrollPane xyzScrollPane1 = java.awt.ScrollPane();
            // Create AWT component which is to be used for print and display purposes.
            Button xyzButton1;
            Button xyzButton2;

xyzScrollpane1.add(xyzButton1);  //Add 1st button to scrollpane
            xyzScrollpane1.add(xyzButton2);  //Add 2nd button to scrollpane 4th:        xyzScrollPane.printAll(xyzGraphics);

5th:        xyzGraphics.dispose();

For 2nd AWT component within a single page
            repeat above

For Nth AWT component within a single page
            repeat above

Page Two
repeat above

Page N
repeat above

6th:    xyzPrintJob.end().
```

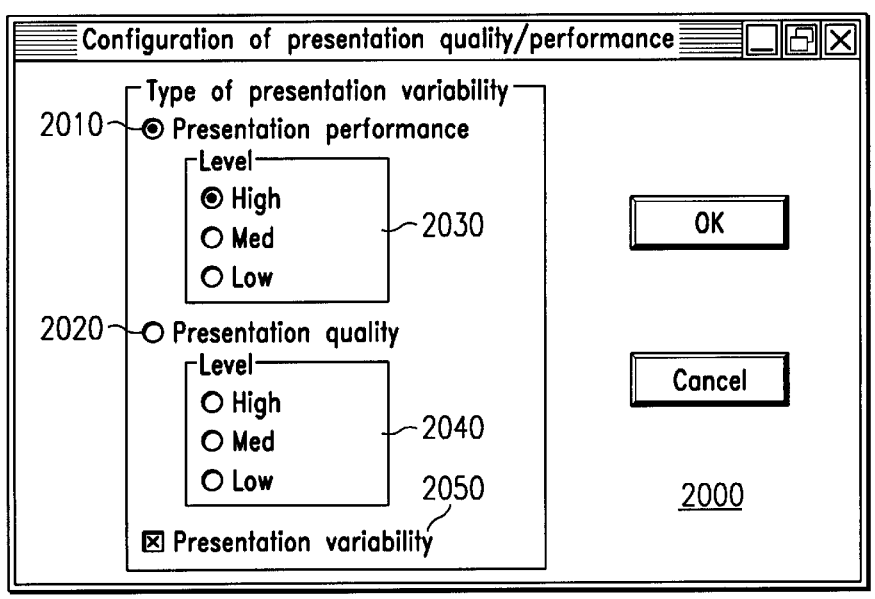

FIG. 20

METHOD AND SYSTEM FOR PROCESSING GLYPH-BASED QUALITY VARIABILITY REQUESTS

CROSS-REFERENCE TO RELATED APPLICATIONS

The present application is related to Application Ser. No. 09/204,518, filed (concurrently herewith), titled "Method and System for Virtual Machine Rendering of Non-Latin1 Unicode Glyphs," and Application Ser. No. 09/204,515, filed (concurrently herewith), titled "Method and System for Specification of Data-presentation Variability Data Via Scaleable Interface."

BACKGROUND OF THE INVENTION

1. Technical Field

The present invention relates generally to an improved data processing system and, in particular, to a method and system for presenting glyphs. Still more particularly, the present invention provides a method and system for varying the quality or performance of glyph presentation processing on a glyph-by-glyph basis within a data processing system.

2. Description of Related Art

Almost all computer programs, which have a graphical user interface or which display text to a user, employ some type of character display subsystem. In recent years, these display methods have become more sophisticated, and new terminology has arisen to satisfy the need for more precise concepts. Many applications currently refer to glyphs, characters, and fonts.

It is important that one understand the separate concepts behind the words "character", "glyph", and "font". A "character" is a symbol that represents items like letters and numbers in a given writing system, for example, lowercase-g. When a given character is drawn on a presentation medium, a shape is presented which represents the character. This shape is called a "glyph". A font is a collection of glyphs.

Characters and glyphs do not have a one-to-one correspondence. As an example, lowercase-a-acute can be represented by two glyphs: lowercase-a and acute. Another example is ligatures, such as ligature-fi, which is a single glyph usually representing two characters: f and i. This lack of a one-to-one correspondence becomes an even larger problem when one moves from a Latin font to a non-Latin or Asian font.

A font is a collection of glyphs and may have many typefaces, e.g., heavy, medium, oblique, gothic, and regular. All of these typefaces have similar typographic features and can be recognized as members of the same family. In other words, a collection of glyphs with a particular style form a font face, a collection of font faces forms a font family, and a collection of font families forms the set of fonts available on a system.

Character encoding is a conversion table that maps characters codes to glyph codes in a font. For example, ASCII (American Standard Code for Information Interchange) is a common coding scheme found in most computers. The character encoding used in the Java™ virtual machine is Unicode. For more information on Unicode, one may refer to http://www.unicode.org. It is expected that most virtual machines in the future will employ the Unicode encoding standard as it is designed to be a universal standard.

One of the most touted features of Java is its portability. With the "write once, run anywhere" concept, it is envisioned that a Java application or applet could run on a mainframe computer and, without modification, also run on a hand-held device or Personal Digital Assistant (PDA). Obviously, a PDA and a mainframe computer have widely varying computing resources. So, a Java virtual machine (JVM) running on these platforms may have widely varying amounts of memory or bandwidth at its disposal, and a properly designed JVM should be designed to take advantage of the available resources while accomplishing the goal of portability. Hence, one of the implicit features of a JVM is its scalability-a JVM presents itself to a JDK application in a standard environment, which is valid across varying computer platforms. A properly designed JDK application should be designed to handle all of the combinations of computing resources which may be available on a host platform so that the application executes properly, i.e., a JDK application should be scaleable and variable.

Some users are more familiar than others with the scalability and variability of computer resources. Printer capability is one consideration of computer resources with which most users are familiar. Many users understand that printers can be fast or slow and that this speed varies for several reasons, most notably time versus complexity. For example, complex graphics may require more time to print. Many applications have printer driver settings, which allow a user to vary the quality of the printout from draft quality to high quality, and a user may choose a particular quality because of a previous, personal decision as to the requirements to be accomplished and the amount of time available to accomplish those requirements. However, the specified choice then becomes a value, which the application must use. For example, if the user chooses draft quality, then the application must produce draft quality. The application does not have the ability to provide a range of quality variability depending on the availability or scalability of particular computing resources—the user has already predetermined the outcome of the output. Heretofore, the scalability of the computing resources has not been presented to the user so that the user may have a minimal ability to specify a preference in the manner of using those resources across all applications. The user is not able to indicate a mere preference without mandating the outcome, for example, in a manner such as, "Quality is not important, so if the computing resources for medium quality are not plentifully available, whatever those computing resources may be, then use available computing resources to generate adequate quality output."

As noted above, users are most notably aware of the tradeoffs involved in print processing. By noting that the tradeoffs involved in the preparation of any type of data for displaying are similar to those involved in printing, one may expand the recognition of the problem to generic data-presentation.

As Unicode is used in more applications, Java™ applications will expect to be able to display and print both Latin1 and Latin5 Unicode glyphs simultaneously. Since portability is the most touted feature of Java™, all Java™ applications should attempt to be portable to a variety of locales. In order for such applications to remain portable, a generic scheme is needed for providing a range of quality variability while also handling Unicode glyphs.

SUMMARY OF THE INVENTION

This invention provides a user with the ability to specify variability in the generation of data for data-presentation on an output device, and these variability specification may be applied on a glyph-by-glyph basis to the presentation of glyphs. A data processing system provides processing of glyph-based quality variability requests in the following manner. The system receives a request for data-presentation of a series of glyphs and determines, for each glyph in the series of glyphs, whether quality variability is applicable to each glyph. If quality variability is applicable to each glyph, then the system determines a quality variance to be applied to each glyph based on predetermined data-presentation variability data and performs data-presentation of each glyph on an output device in accordance with the quality variance.

By providing quality variability on a glyph-by-glyph basis, a relatively simple glyph, such as those used for Latin1 characters, may be presented using low quality. However, a more complex glyph which may require a clear presentation of its more delicate detail for a proper comprehension of the glyph, such as various Chinese characters, are presented using high quality. In this manner, computing resources may be preserved or tailored on a glyph-by-glyph basis.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart depicting the high-level view of the control flow from a user action to the invocation of a drawstring( ) request.

FIG. 6 is a flowchart depicting the manner in which a JDK application processes a user print request.

FIG. 7 is a flowchart depicting the preparation of various data types for output data-presentation processing.

FIG. 17 illustrates a pseudocode control path for a Java application that calls the drawstring( ) method directly.

FIG. 18 illustrates a pseudocode control path for a Java application that calls the drawstring( ) method indirectly while printing multiple AWT component objects separately.

FIG. 19 illustrates a pseudocode control path for a Java application that calls the drawstring( ) method indirectly while printing multiple AWT component objects all at once.

FIG. 20 illustrates a graphical user interface window that depicts an exemplary manner in which a computer system may provide a user with the ability to specify variability in the generation of data for data-presentation on an output device.

DETAILED DESCRIPTION OF THE PREFERRED EMBODIMENT

Figure 1:
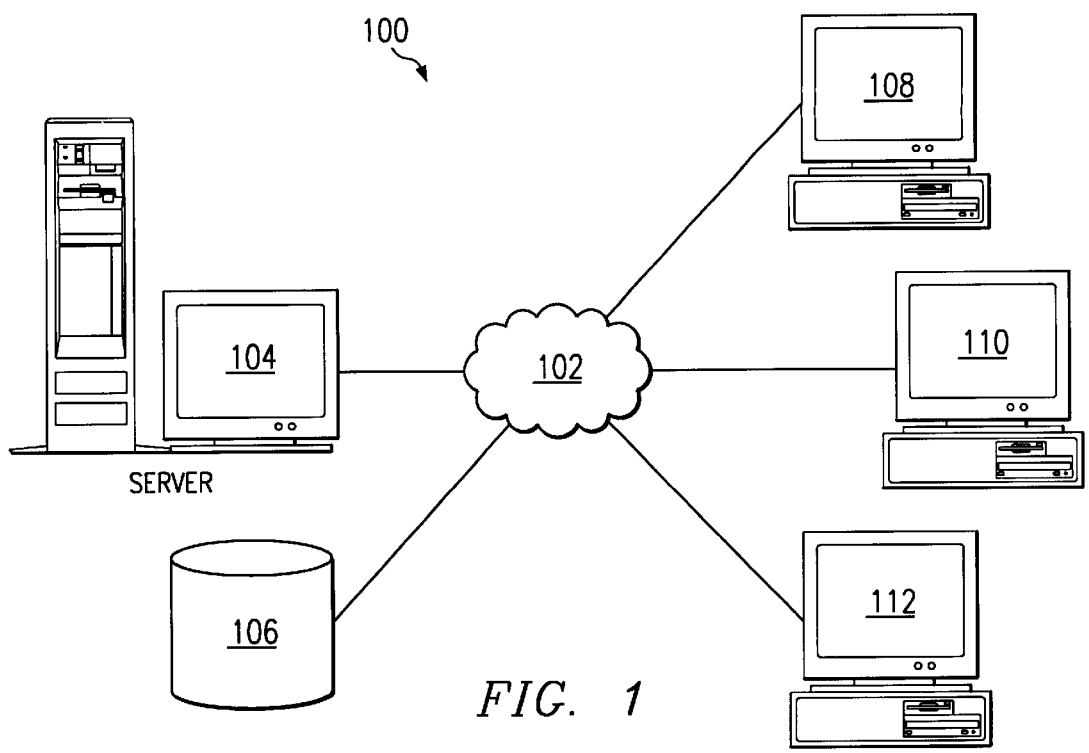
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN).

FIG. 1 is intended as an example, and not as an architectural limitation for the processes of the present invention.

Figure 2:
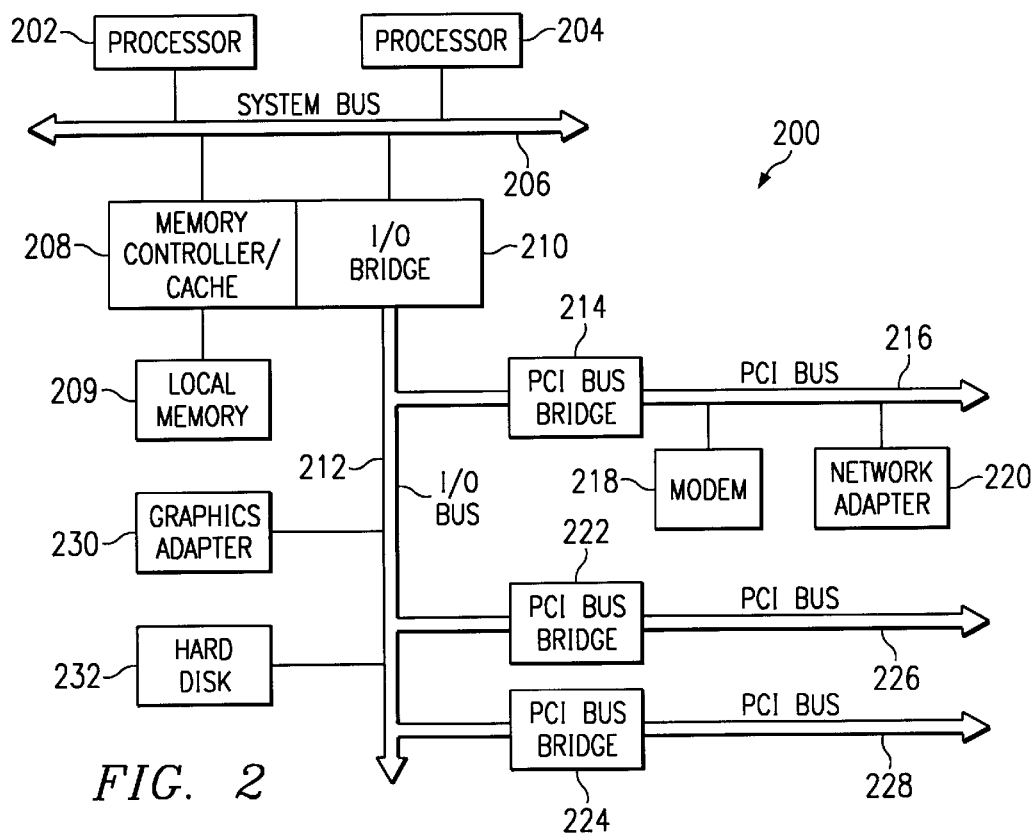
FIG. 2 is a block diagram depicting a data processing system, which may be implemented as a server in a distributed data processing system.

Referring to FIG. 2, a block diagram depicts a data processing system, which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
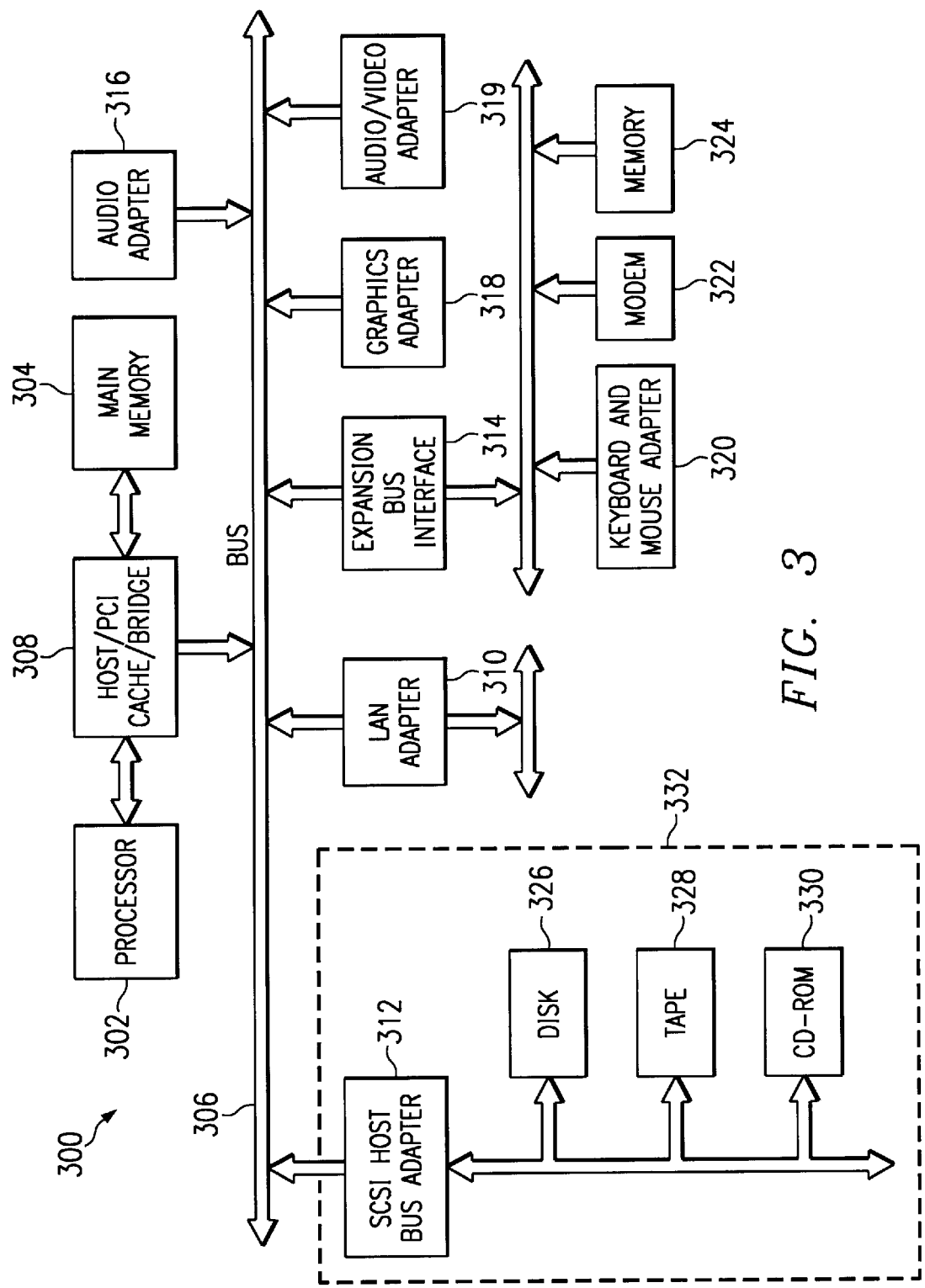
FIG. 3 is a block diagram illustrating a general data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and printer adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors. Data processing system 300 could be connected through graphics adapter 318 to a computer display (not shown) and through printer adapter 319 to a printer (not shown).

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

Although FIGS. 1–3 provide examples of configurations of computer systems on which the present invention may execute, the following background information may provide a context for understanding the overall computing environment in which the present invention, as described in FIGS. 4–20, may be used.

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information. A browser is a program capable of submitting a request for information identified by a URL at the client machine. Retrieval of information on the Web is generally accomplished with an HTML-compatible browser. The Internet also is widely used to transfer applications to users using browsers.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK), available from Sun Microsystems, Inc., may be used to build Java byte code from Java language source code and libraries. This Java byte code may be stored as a Java application or applet on a Web Server, where it can be downloaded over a network to a user's machine and executed on a local JVM.

The Java run-time environment is specifically designed to limit the harm that a Java application can cause to the system that it is running on. This is especially important with the World Wide Web, where Java applets are downloaded and executed automatically when a user visits a Web page that contains Java applets. Normally one would not want to execute random programs; they might contain viruses, or they might even be potentially malicious themselves and not merely carrying unwelcome code unintentionally. Unless the user specifically allows it (by setting the appropriate flags in the user-interface to the JVM), a Java applet cannot read or write to attached storage devices (except perhaps to a specific, restricted area), nor can it read or write to memory locations (except to a specific, restricted area).

Not only are Java applets designed for downloading over the network, standard Java libraries also specifically support client-server computing. The Java language includes provisions for multi-threading and for network communications. Compared to other languages (such as C), it is much easier to write a pair of programs, one executing locally on the user's computer that is handling the user-interaction, and the other executing remotely on a server, which is performing potentially more sophisticated and processor-intensive work.

While the Java language is designed to be platform-independent, and to execute primarily in a secure environment, programmers can extend Java applications through the use of compiled native binary code on the host operating system using C-style calling conventions through the Java Native Interface (JNI). In this fashion, a Java application can have complete access to the host operating system, including reading and writing to attached I/O devices, memory, etc. Because of this, Java programs can accomplish tasks that are not normally allowed via the JVM at the cost of being platform-specific. However, with a well-designed architecture, a Java language programmer can cleanly isolate the platform-independent portion, and present a clean, platform-independent object API to other Java components while at the same time accomplishing platform-specific tasks.

Every Java virtual machine contains the Abstract Windows Toolkit (AWT). This toolkit contains primitives for basic windowing functionality. These primitives include such user-interface functionality as window and dialog box manipulation, text rendering, buttons, check box, and radio button creation and manipulation, as well as graphics primitives such as line drawing, color choice, etc. Virtually all more sophisticated graphics and user-interface tools are built on top of these AWT primitives.

The Java Foundation Classes (JFC) is a package containing (among a bunch of other things) primitives for windowing functionality that provide a rich superset of the AWT. These primitives (or components) include everything that the AWT provides (buttons, check boxes, etc.), along with a rich set of new primitives, including tree views, tabbed panes, HTML text views, etc.

Figure 4:
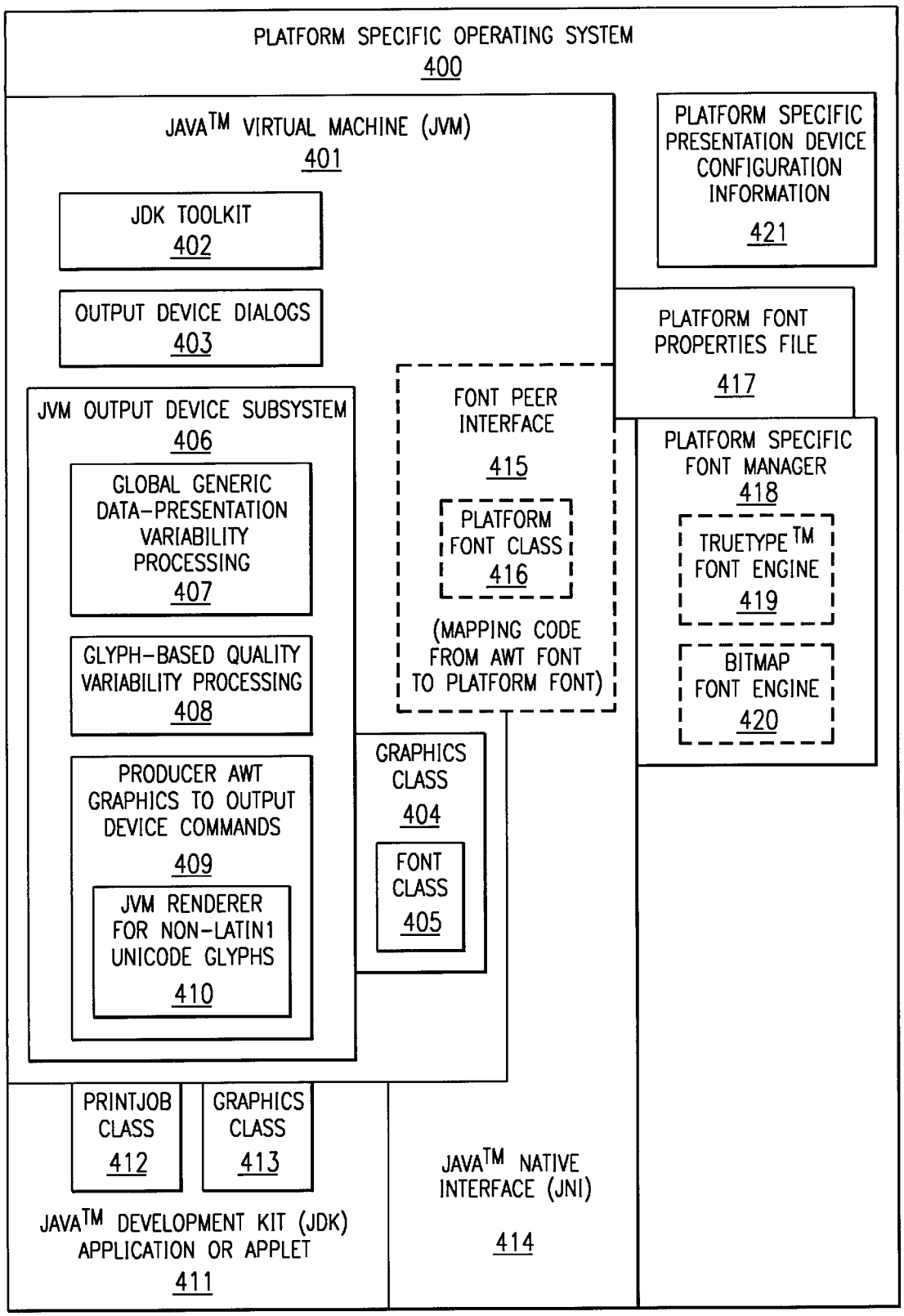
FIG. 4 is a block diagram depicting an example of a logical configuration of software components for implementing the preferred embodiment of the present invention using a virtual machine and a host operating system.

With reference now to FIG. 4, a block diagram depicts an example of a logical configuration of software components for implementing the preferred embodiment of the invention. For example, these software components could be found on a data processing system 300. As previously described above, Java JDK application or applet 411 executes under Java Virtual Machine 401, which further executes under platform specific operating system 400. Application or applet 411 contains PrintJob Class 412 and Graphics Class 413, which enable it to perform some of the data-presentation processing. JVM 401 and the application or applet 411 share the Graphics Class 404 and Font Class 405, which provide Graphics Environment information and methods for various data-presentation processes. JVM 401 could be embedded within a printer device, hardcopy device, PDA, data processing system 300, etc., as a software component or as part of a virtual machine implemented on a chip.

Platform specific or host operating system 400 also includes platform specific font manager 418 that provides access to various font information through the Font Peer Interface 415, which uses the JNI 414. The depicted font manager, which shows optional TrueType™ font engine 419 and optional bitmap font engine 420, is shown for exemplary purposes only as the specific configuration of a font manager could vary widely across host operating systems. Platform specific font manager 418 provides platform specific font information to Java Virtual Machine 401 through JNI 414.

Font Peer Interface 415 bridges or "peers" JVM 401 and JNI 414. Peer interfaces are well-known in the Java environment and are generally accessible to application developers. However, unlike various classes that would be generally available to developers as part of JVM 401, such as Output Device Dialogs 403 or JDK ToolKit 402, Font Peer Interface 415 must be implemented by those who desire to port a JVM to various systems as it is platform specific. Within Font Peer Interface 415 is Platform Font Class 416, which is not publicly exposed.

Peer interfaces enable a JVM to access various information on the host platform. In this case, Font Peer Interface 415 may access information in platform font properties file 417. An important function of Platform Font Class 416 is to provide method(s) as the mapping from an AWT font to a platform specific font. In so doing, the Platform Font Class 416 is the bridge through the Font Peer Interface between the JVM code and the JNI code. Each JVM must implement a Font Peer Interface-most would use a Platform Font Class in conjunction with a platform specific font properties file.

The Java run-time environment provides a list of available fonts upon request. These fonts are mapped to real fonts available from the host operating system when the JVM initializes. The font mapping is specified in a font properties file.

The Java 2D API defines a Font class that provides detailed information. The information that describes a font, such as its name and style parameters, is contained in Font attributes and in FontFeature objects. Every Font object contains an array of FontFeatures describing the particular font, as well as attributes for font name, size, and transform. The Font class defines several convenience methods that allow the application to access this data directly. The Font class also provides access to font metrics as every Font object contains the detailed metrics for the font.

Within JVM 401 is JVM Output Device Subsystem 406, which is an example of a logical grouping of JVM components which provide some of the data-presentation processing. Producer-AWT-graphics-to-output-device-commands 409 provides functionality for sending JVM graphical or data-presentation data to output devices. JVM renderer for non-Latin1 Unicode glyphs 410 provides support for rendering such glyphs within the TVM, which is particularly useful if printer does not support such glyphs. Global generic data-presentation variability processing 407 provides functionality for determining, storing, and retrieving global generic data-presentation variability data values, which contain parameters for determining applicability of computer resources which are applied to data-presentation processing. Glyph-based quality variability processing 408 provides functionality for applying predetermined quality variability parameters, obtainable from global generic data-presentation variability processing 407, on a glyph-by-glyph basis as data-presentation processes are generating the data required for presenting those glyphs on an output device.

With reference now to FIG. 20, a graphical user interface window depicts an exemplary manner in which a computer system may provide a user with the ability to specify variability in the generation of data for data-presentation on an output device, such as a display or printer. Although the preferred embodiment comprises the ability of the user to manually input a preference for variability processing, alternatively, the system could automatically determine data-presentation variability parameters in a variety of manners, such as by analyzing the hardware and software configuration environment of the data processing system 300. This would be particularly useful for commencing the operation of data processing system 300 with default values for data-presentation variability parameters.

Variability determination/configuration dialog box 2000 allows a user to specify choices with respect to data-presentation variability parameters. Exclusive choices for either a quality parameter or a performance parameter are provided to the user through the use of radio buttons 2010 and 2020. In this example, only two parameters, quality and performance, are provided, whereas more or other parameters, such as time, cost, etc., could be provided depending on a variety of factors: the complexity of the data, such as glyphs, images, text images, etc., that is to be presented on the output device; the operational constraints of the output device; the sophistication of the user; the intelligence level of the viewers of the presented output data, etc. In the example in FIG. 20, the quality variability parameter and the performance variability parameter are associated with each other in a mathematically inverse relationship. In another case, time and effort versus cost may be two specified parameters with inverse relationships. If the variability parameters have mathematical or logical relationships, which associate one parameter with another, then these various parameters could be mapped from one parameter to another in various manners.

Exclusive choices for a range of the level of the values for each of the parameters, are provided to the user through the use of radio buttons 2030 and 2040. In this example, three values are given for the level of values: "high", "med", and "low". In a case of time versus cost, the range of values could be given in a different scale, such as "frequent" or "infrequent" and "inexpensive" or "expensive." Again, the number of values presented to the user could be fewer or more, the range of values could be given in a different scale, and the type of values could represent many different resource considerations. Throughout the remainder of the detailed description of the invention, one type of variability parameter, quality, is used as an exemplary variability parameter as it is assumed that other variability choices could be logically mapped to a quality consideration.

A check box 2050 allows a user to specify whether any of the other variability parameters should be used as part of any of the computer processes which generate data for data-presentation, thereby allowing a user to override any of the other parameters. If this box were not checked, any process that generates data for data-presentation would not be expected to perform presentation variability processing. The value of check box 2050 is stored as a toggle value, which indicates, in an on/off or true/false manner, whether variability processing is specified.

With reference again to FIG. 4, the methods for presenting variability determination/configuration dialog box 2000 would be included as part of the Output Device Dialogs 403. These public methods could be implemented in various manners: as part of JVM 401; as part of the JDK available for calling by all JDK applications and applets 411 as necessary; or implemented in other manners. After the determination of the data-presentation variability parameters, such as through user input in variability determination/configuration dialog box 2000, JVM 401 stores these parameters and other associated data through global generic data-presentation variability processing 407 within JVM Output Device Subsystem 406.

The data has the characteristic of being "global" as any process may query the data, although other methods could access the stored data through remote method invocation or through the reflection functionality in Java™. It is contemplated that a method executing under control of JVM 401 would query the data or otherwise use the data indirectly through the invocation of another method which provides the values of the stored data, which may be implemented by generic data-presentation variability processing 407.

The data has the characteristic of being applicable to "generic data-presentation" as any process which generates data for data-presentation—without regard to whether the physical manner of presenting the data is displaying, printing, or otherwise outputting—would be able to use the variability data values as input to the data generation steps being performed within the process. In this manner, the variability data could be generically applied, for example, to both print processing and display processing.

For example, if a user had requested high-level presentation performance through the selection of radio buttons 2010 and 2030, as in the example of FIG. 20, any process within JVM Output Device Subsystem 406 could apply "high performance/low quality" as an input to all process steps which generate data for data-presentation. If a method, such as drawString( ), generated data, such as glyphs or text images, for data-presentation (displaying) on a display device, the rendering of the data-presentation data (image data) for the glyphs could be done according to high performance method steps in those processes used during drawstring( ). Moreover, if an application required that the same glyphs be rendered as image data for data-presentation (printing) on a printer or hardcopy device, then the rendering of the image data could be performed with high performance method steps in the appropriate processes which print data in accordance with the same data-presentation variability data used for displaying the data.

With reference now to FIGS. 5–16, the flowcharts depict the flow of control between various portions of software components shown in FIG. 4. The depicted flowcharts are meant merely to provide an example of the flow of control through various method calls and other portions of software code from an initial user action to the final output of presentation data. The output device in the following examples is a printer or hardcopy device. The JVM Output Device Subsystem 406 is then conceptually equivalent to a JVM Print Subsystem 406, and these terms are to be used interchangeably through the following examples. The flowcharts should not be interpreted as providing all details concerning subroutine or function calls between various portions of software code nor should they be interpreted as a complete control flow diagram of all aspects of the present invention. One of ordinary skill in the art would understand that only some of the many steps concerning the software execution for flow of control between the various components in the platform specific operating system, the Java Virtual Machine, and the JDK application or applet are shown.

With reference now to FIG. 5, a flowchart depicts the high-level view of the control flow from a user action to the invocation of a drawstring( ) request. The process starts (step 500) when a user issues a print request to the JDK application (step 510), which processes the user print request (step 520), which is described in more detail in FIG. 6. The JVM processes the invocation request for various public class methods invoked from either the JDK application or other JVM components (step 530). These methods would include the various printAll methods, printGraphics methods, printcomponent methods, print and drawstring( ) methods, etc., as previously described. The JVM Print Subsystem 406 Graphics class methods then execute in response to their invocations (step 540), which is described in more detail in FIG. 7. The overall control flow process continues when the JVM Print Subsystem Graphics class drawstring( ) method executes (step 550). The arguments to the drawstring( ) method would include: the string to be presented on an output device (in this case, a printer); the (X,Y) coordinates at which to present or print the string; and an optional quality data value obtained from global generic data-presentation variability processing 407, although the data-presentation processes may obtain the variability data values directly or indirectly at a later point in the processing. This step is described in more detail in FIG. 8A. After the completion of the process in FIG. 8A, which shows the execution steps of drawstring( ), the process returns to FIG. 5 (step 550), where the process continues (step 560) with the return of control to the appropriate calling location.

With reference now to FIG. 6, a flowchart depicts further processing details of the manner in which the JDK application processes the user print request (step 520). Again, these steps follow a print example but would be similar for some other hardcopy device or a generic output device. The process starts (step 600) when the JDK application initiates the PrintJob (step 610). As would be understood by one of ordinary skill in the art, various Java methods must be invoked to initialize the graphics environment for subsequent function calls. These may include such things as setting the font for the graphics environment, etc. The JDK application, for example, gets a PrintJob class (step 620).

The JDK application then gets a Graphics class (step 630). Many of the AWT methods will use these shared instances of these classes. The JDK application then invokes various other JVM public methods, either directly or indirectly (step 640). The process then returns control (step 650) for further processing of the user print request.

In order to provide further background information on the workings of the Java environment, FIGS. 17–19 describe the execution of a JDK application 411. An applet or JDK application 411 would invoke various JVM methods, either directly or indirectly (as noted in step 640), that would eventually require the rendering of Unicode glyphs, either within JVM 401 or within the printer device. Although the Unicode encoding values of the text strings in the AWT components are not shown, it should be evident that the possible content in the text strings could include non-Latin1 Unicode glyphs, which would then require JVM rendering of the non-Latin1 Unicode glyphs 410. The Unicode data would come from the Graphics class's methods, which are invoked by the application or applet being run within JVM 401, or the JVM's implementation of a container class of the java.awt component class.

A JDK application (main( ) method) or a JDK applet (run( ) method) executes on top of an operating system's implementation of the JVM. Java programs have the ability to generate hardcopy for a user by invoking methods of a Graphics class object to draw items on hardcopy in the same manner that the methods are used to draw items on a display screen.

The JDK's toolkit class can provide a Printjob class to the application or applet. The JVM Print Subsystem provides a Graphics class, which implements all the methods that are implemented by the Abstract Windowing Toolkit's (AWT) Graphics class. This Graphics class implements the Print-Graphics interface to distinguish it from the AWT Graphics class.

In FIG. 17, a pseudocode control path is illustrated for a Java application that calls the drawstring( ) method directly. After receiving the Graphics class, the drawing primitives provided in the class can be used to render the page for the user. Typically, the same primitives that are used to render the display image are used to render the hardcopy image, and these primitives can be grouped into images, text, and other drawing primitives (box, rectangle, circles, etc.). After the page is rendered, the dispose method to the Graphics class is used to dispose of the Graphics class. This process has to be repeated when doing page two, page three, . . . page n.

With reference now to FIG. 18, a pseudocode control path is illustrated for a Java application that uses multiple AWT component objects that are printed separately. AWT components, such as scrollpanes, buttons, etc., can be reused by the application to create user interfaces easily. With a mixture of AWT components that need to be displayed or printed, separate Graphics classes are used to describe each component within a single page. To print each component, the application must obtain a Graphics class as defined above and then send it to the printcomponent( ) method in the AWT component class. It should be noted that by default the AWT print( ) method passes this Graphics class to the paint( ) method.

In FIG. 18, the AWT application would be calling the drawString( ) method indirectly. The scrollpane object could have been a button object that had associated text, such as a text label, and as part of the execution of printcomponent( ), the text label would have also been printed. In order to print the text label of the button, the drawstring( ) method would eventually by invoked.

With reference now to FIG. 19, a pseudocode control path is illustrated for a Java application that uses multiple AWT component objects that are printed all at once. To print all the components by doing one method call, the application must obtain a Graphics class as defined above and then send it to the printAll( ) method in the AWT root component of the hierarchy. Note that by default the AWT printAll( ) method passes this Graphics class to the paintAll( ) Method.

It should be noted again that, in the example shown in FIG. 19, the AWT application would be calling the drawString( ) method indirectly. If the button objects had associated text, such as a text label, as part of the execution of printcomponent( ), the text.label would have also been printed. In order to print the text label of the button, the drawstring( ) method would eventually by invoked.

With reference now to FIG. 7, a flowchart depicts further processing details of the preparation of various data types for output data-presentation processing, as mentioned above with respect to step 540. The process starts (step 700) with a determination of whether the drawChar( ) method has been invoked (step 710). If the drawChar( ) method has been invoked, then the char data is converted to string data (step 720), and the drawString( ) method is then called with the new string data (step 730). If the drawChar( ) method has not been invoked, then a determination is made as to whether the drawByte( ) method has been invoked (step 760). If the drawByte( ) method has been invoked, then the byte data is converted to string data (step 770), and the drawstring method( ) is then called with the new string data (step 730). If the drawByte( ) method has not been invoked, then a determination is made as to whether drawstring( ) method has been invoked (step 780). If so, then the drawstring( ) method is executed (step 740). The process ends with a return to the location that has invoked the method (step 750).

Figure 8A:
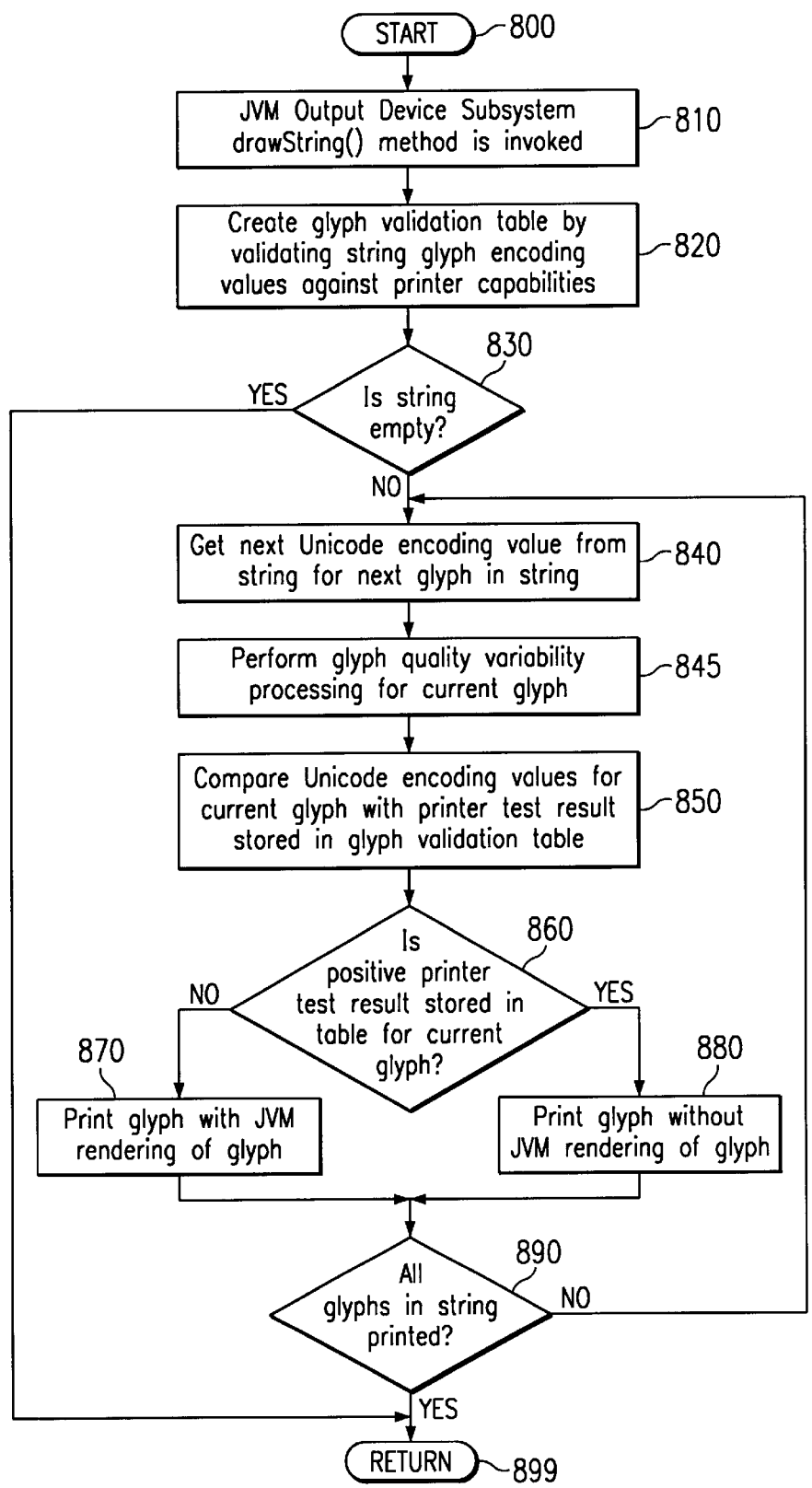
FIG. 8A is a flowchart depicting a set of method steps that could be executed as an exemplary implementation of the drawString( ) method.

With reference now to FIG. 8A, a flowchart depicts a set of method steps that could be executed as an exemplary implementation of the drawString( ) method. The process starts (step 800) when the JVM Output Device Subsystem's drawString( ) method is invoked (step 810). A glyph validation table is created for validating string data against the printer capabilities (step 820), which is described in more detail in FIG. 9. The drawString( ) method execution continues when a determination is made as to whether the current string is empty (step 830). If so, then the process returns to the proper calling location (step 899). If the string contains more data, then the process gets the next Unicode encoding value from the string for the next glyph.in the string (step 840) and performs glyph-based quality variability processing for the current glyph (step 845), which is described in more detail in FIG. 8B. Again, in following the printer example through the code flow, the method steps adhere to the accommodation of hardcopy output device or printer device processing. The process then compares the Unicode encoding value for the current glyph with the printer test results stored in the glyph validation table for that particular glyph (step 850). A determination is made as to whether a positive printer test result is stored in the table for the current glyph (step 860). If so, then the process prints the glyph without JVM rendering of the glyph (step 880), which is described in more detail in FIG. 10. If the printer test result is negative, then the process prints the glyph with JVM rendering of the glyph (step 870), which is described in more detail in FIG. 11. A determination is then made as to whether all the glyphs in the string have been printed (step 890). If so, then the process returns to the proper calling location (step 899). If not, then the process repeats by returning in the loop (step 840) for further printing of other glyphs contained in the current string.

The overall processing, primarily described in FIG. 4 and FIG. 8A, is primarily glyph-based instead of font-based and work within the current confines of Java™ classes and methods. The described system and methods in this invention are primarily an extension of the Java language that, among other advantages, expose a host font manager, such as a TrueType™ font engine, in such a way as to bring the bitmap of a glyph into an application or applet executing on the virtual machine. Data-presentation processes also have the advantage of performing quality variability processing in a global and generic manner. These advantages may be combined to perform quality variability processing on a glyph-by-glyph basis.

FIGS. 8B–16 provide a more detailed description of the steps executed during drawstring( ) as described in FIG. 8A.

Figure 8B:
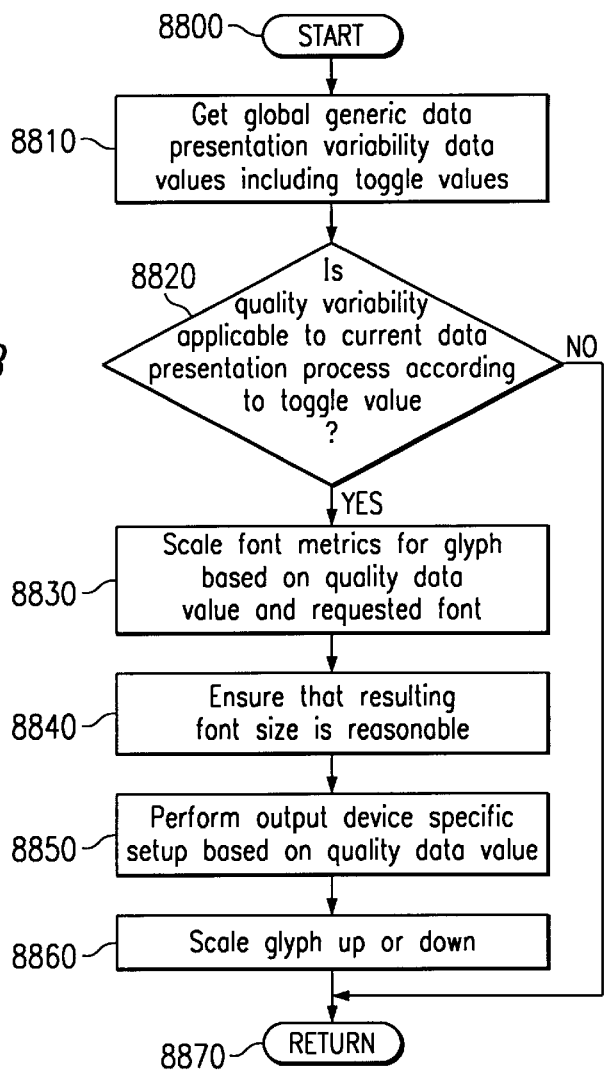
FIG. 8B is a flowchart depicting a process for performing glyph-based quality variability processing for a glyph.

With reference now to FIG. 8B, a flowchart depicts a process for performing glyph-based quality variability processing for the current glyph, as discussed with respect to step 810 above. The process starts (step 8800) with the retrieval of the global generic data-presentation variability data values, which includes a toggle value and possibly other quality variability values. A determination is then made as to whether, according to the toggle value which is set on/off or true/false, quality variability is applicable for the current data-presentation process (step 8820). If not, then the process returns for further drawString( ) processing (step 8870). If so, then the process continues by scaling the font size for the current glyph according to the current quality variability values and the requested font (step 8830).

As the process will ultimately obtain a glyph bitmap, one should obtain the most accurate bitmap possible for the needed accuracy of the glyph bitmap. By scaling up the request, for example, the process will obtain a more detailed bitmap in a larger font size in which each pixel or bit is more accurately placed for a given coordinate point than a smaller font size in which a bit or pixel is placed less accurately. However, there is a tradeoff in the amount of data and processing time-larger font sizes require more data and more processing whereas smaller font sizes require less data and less processing time. By scaling down the request when possible, the processing time is reduced while also reducing the accuracy of the bitmap representation of the glyph.

For example, if the quality variability value contains a value indicating high quality, then the requested font size may be scaled up, e.g., by a factor of four. If the quality variability value contains a value indicating low quality, then the requested font size may be scaled down, e.g., by a factor of two. The process then compares the modified font size with available font sizes for the requested font in order to ensure that the resulting font size is reasonable (step 8840). For example, the modified font size may exceed the maximum font size of the available requested font or may be below the minimum font size. Other considerations may also be factored into the reasonableness of the request, such as output device constraints or human perceptible limits. If the modified font size is unreasonable, it may again be modified until a useful font size is determined.

The process then performs an output device specific setup based on the quality data values (step 8850) as the output device may need to be initialized for the current glyph. The process then scales the glyph up or down (step 8860) based on the determined quality variability steps above. The glyph may be scaled up or down in software, such as during the rendering of a glyph in the virtual machine, or in hardware. In the hardware case, the process may store scaling data in preparation for transmittal to the output device, at which time the glyph information is sent to the output device in order for the output device to perform the scaling. Depending on the chosen implementation, the process to determine whether to scale in software or hardware can be rather complex. Some of the inputs into the decision-making process may include many types of information, such as memory availability, type of printers available, the font technology that is being used, empirically derived constraints, human perceptible limits, etc.

If the glyph is to be scaled in software on the virtual machine, then the current font is saved (font metrics, etc.) as well as the invoking application or applet's current request information, such as font name, font size, and font style. The new font is then generated based on the determined scaling information, and the new font (new font metrics, etc.), is subsequently used for glyph processing. The previous font will be restored after the processing for the current glyph is completed. The process then returns for further drawstring( ) processing (step 8870).

Figure 9:
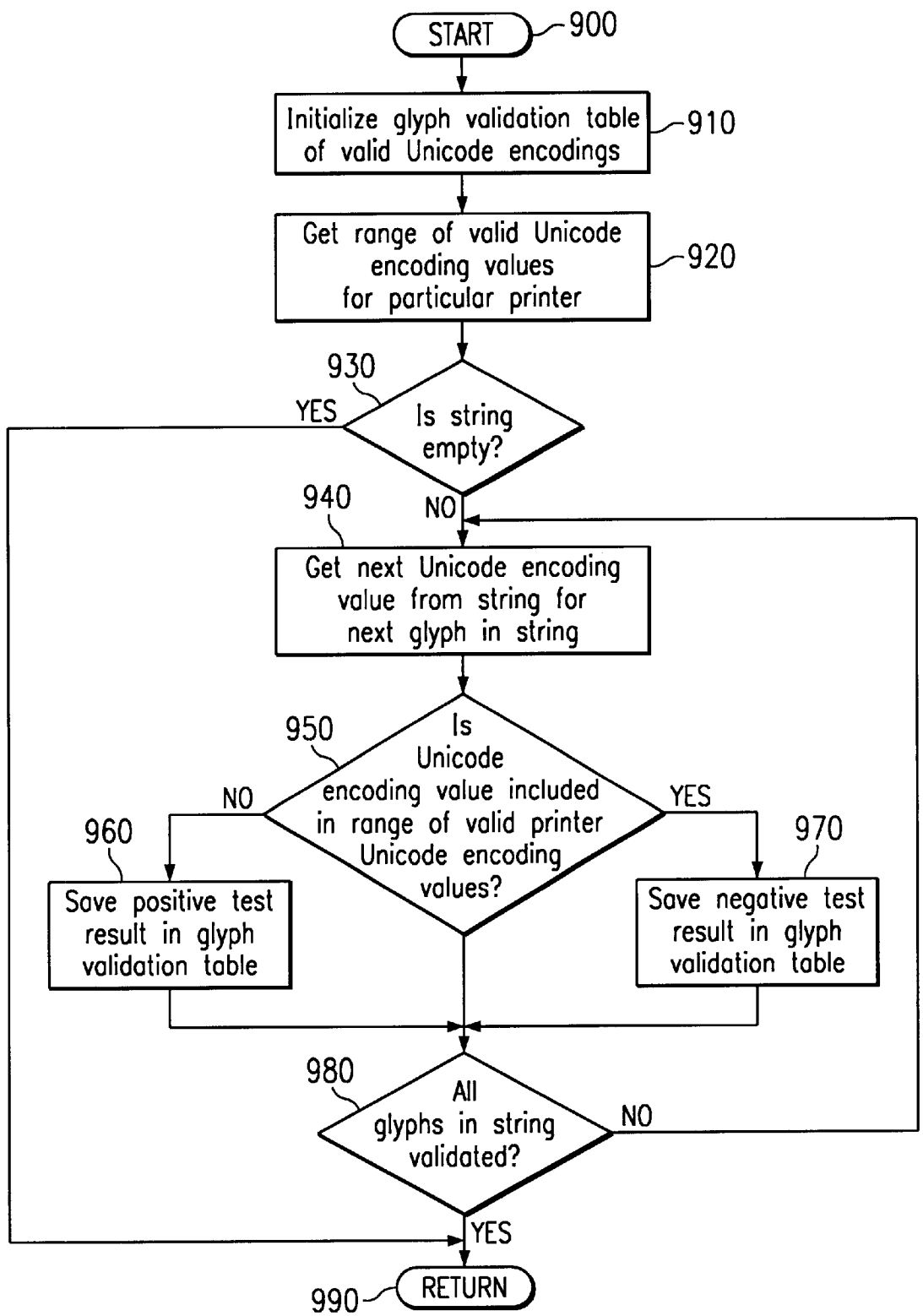
FIG. 9 is a flowchart depicting the creation of the glyph validation table to be used in determining the applicability of JVM glyph rendering.

With reference now to FIG. 9, a flowchart depicts the processing details for the creation of the glyph validation table, as mentioned in step 820 above. Although the following description discusses the use of a particular table for validating the printer capabilities, one of ordinary skill in the art would understand that various equivalent methods could be used to determine the necessary printer capabilities for comparison and analysis against the desired glyphs. The process starts (step 900) with the initialization of the glyph validation table of a valid printer Unicode encodings for the string (step 910).

The process then obtains the range of valid Unicode encoding values for the printer to be used as the output device (step 920). These ranges may be defined by a printer manufacturer in the printer's hardware specification, and the ranges can vary from one printer to another printer. These are usually hardcoded by printer language to enable only a subset of the Unicode encoding values. As there are various well-known ways to store and query or retrieve this information, these ranges should be available to a method, which may be invoked to obtain these values. For example, these ranges may be stored in JVM 401 or platform specific operation system 400 in tables, which allow the lookup of these values.

A determination is then made as to whether the string is empty (step 930). If the string does not contain any data, then the process returns (step 990). If the string does contain data, then the next Unicode encoding value for the next glyph in the string is obtained (step 940). A determination is then made as to whether the Unicode encoding value is included in the range of valid Unicode encoding values retrieved for the printer (step 950). If so, then the positive test result is saved in the glyph validation table (step 960). If the determination is negative, then the negative test result is saved in the glyph validation table (step 970). A determination is then made as to whether all the glyphs in the string have been validated (step 980). If not, then the process repeats by returning in the loop (step 940). If all of the glyphs in the string have been validated, then the process returns (step 990).

Figure 10:
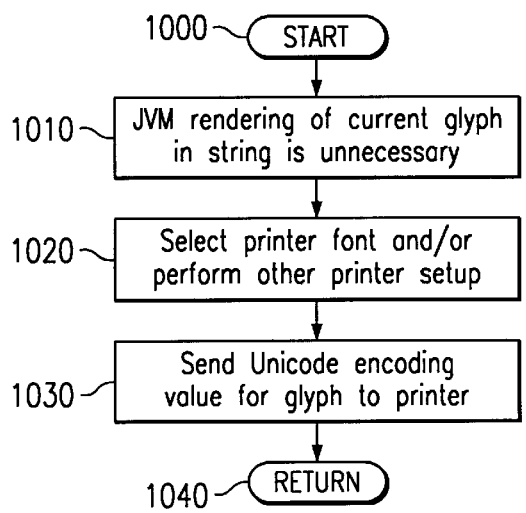
FIG. 10 is a flowchart depicting details of the printing of a glyph without JVM rendering of the glyph.

With reference now to FIG. 10, a flowchart depicts further details of the process when the printing of a glyph proceeds without JVM rendering of the glyph, as mentioned in step 880 above. The process starts (step 1000) with a recognition that the JVM rendering of the current glyph in the string is unnecessary (step 1010). The proper font within the printer is then selected (step 1020), and the process then sends the Unicode encoding value for the glyph to the printer (step 1030). The printer may require other printer language specific data in addition to the glyph's Unicode encoding value or in place of a printer font selection. This data may be associated with the printer's ability to print the current glyph: the printer has a device font present in the printer which contains the glyph; there is a downloaded font in the printer; or a font cartridge could be installed on the printer hardware, which contains the glyph.

Different printers have different printer languages or commands. As noted above with respect to step 8860, the glyph may have already been scaled up or down based on the determined quality variability steps above. However, since the current glyph is being printed without JVM rendering of the glyph at this point, there may be associated scaling data, which must accompany the glyph so that the printer may scale the glyph. Depending on the manner in which the printer processes the scaled glyph, other data may be transmitted to the printer along with the Unicode encoding value. The associated scaling data may have been determined in the quality variability processing, discusses with respect to FIG. 8B. The process then returns (step 1040).

Figure 11:
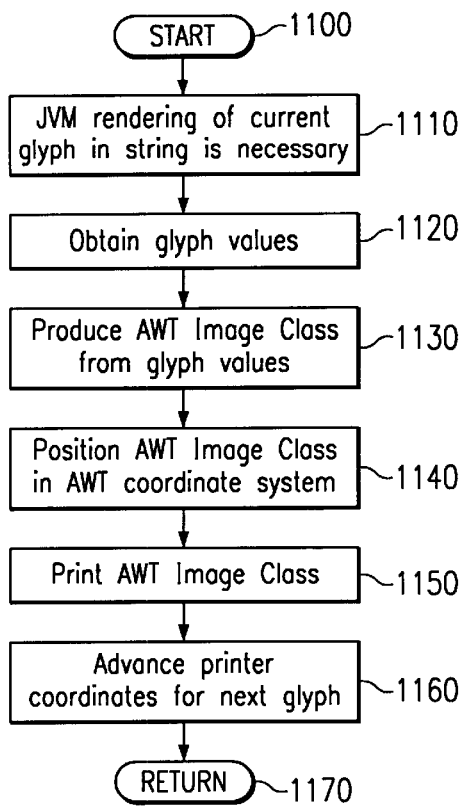
FIG. 11 is a flowchart depicting the manner in which glyphs may be printed with JVM rendering of non-Latin1 Unicode encoded glyphs.

With reference now to FIG. 11, a flowchart depicts the manner in which glyphs may be printed with JVM rendering of non-Latin1 Unicode encoded glyphs if necessary during a call to drawString( ), as mentioned in step 870 above. The process starts (step 1100) with a recognition that JVM rendering of the current glyph in the string is necessary (step 1110). The process then obtains the glyph values that are necessary for determining the bitmap of the glyph (step 1120). The process then continues with the production of an AWT image class from those glyph values (step 1130). The AWT image class is then positioned in the AWT coordinate system (step 1140). The AWT image class is then printed (step 1150). The process then advances the printer coordinates for the next glyph in the string to prepare for the printing of further data (step 1160). The process then returns (step 1170).

FIGS. 12–16 provide a more detailed description for the various steps in FIG. 11.

Figure 12:
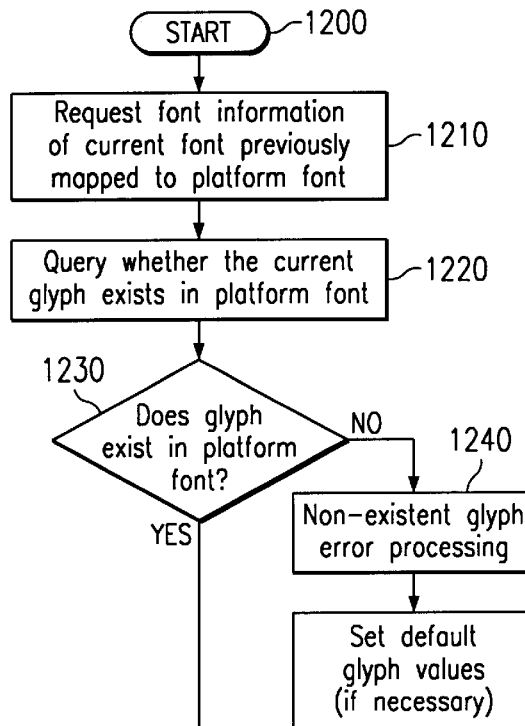
FIG. 12 is a flowchart depicting details for obtaining glyph values from a platform font.

With reference now to FIG. 12, a flowchart depicts further processing details of obtaining glyph values from a platform font, as mentioned above with respect to step 1120. The process starts (step 1200) with the request of font information (step 1210) for the current font. The current font was previously mapped, for example during initialization of JVM 401, to a platform font using Java Native Interface 414, platform specific font manager 418, and platform font properties file 417, as previously discussed with respect to FIG. 4.

JVM non-Latin1 Unicode encoded glyph rendering process 410 uses the Unicode encoding value of the current glyph to query whether the current glyph exists in the platform font (step 1220), which has been selected by the application or applet as the current font and further refined during the quality variability processing discussed above with respect to step 8860. This information may be retrieved from Platform Font Class 416 in Font Peer Interface 415. A determination is then made as to whether the glyph exists in the returned information for the platform font (step 1230). If the glyph does not exist in the platform font, then the process executes non-existent glyph error processing (step 1240).

There are various manners in which a non-existent glyph can be shown on a display or a page printout in order to indicate that some kind of error occurred in obtaining a glyph for the symbol or character which was in the string to be displayed or printed. One method would be to print a solid black block in place of the glyph. Another method would be to merely "print" a blank space in place of the character or symbol. Depending on the manner used to indicate that the glyph is non-existent, the process could then continue by setting default glyph values (step 1250). This might include setting default values for various font metric parameters so that the normal rendering process may continue.

If the glyph does exist in the platform font, then the process requests the glyph font metric values (step 1260). The process then requests the size of the glyph value data (step 1270). The process then allocates memory to store the glyph value data using appropriate JVM method invocations (step 1280). The process then requests the actual glyph value data (step 1290). Having obtained the needed font information, the process then returns (step 1299).

Figure 13:
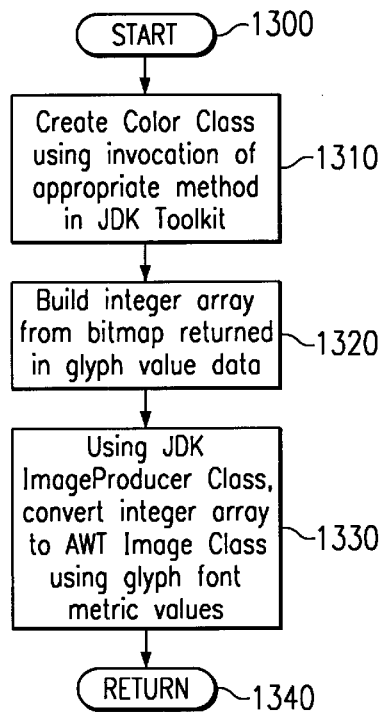
FIG. 13 is a flowchart depicting the production of an AWT Image Class from the retrieved glyph data.

With reference now to FIG. 13, the flowchart depicts the production of an AWT Image Class from the retrieved glyph data, as mention above with respect to step 1130. The process starts (step 1300) with the creation of the Color Class using the invocation of appropriate methods in the JDK toolkit (step 1310). The process builds an integer array for storing the bitmap returned in the glyph value data by using the default color model, the glyph font metrics, and PrintJob Class's foreground color (the default color for text is black) (step 1320). Using the JDK ImageProducer Class, the process converts the integer array to AWT Image Class using the glyph font metric values (step 1330). It should be noted that the AWT Image Class is produced in accordance with the quality variability processing values, such as the requested font.which was previously scaled, discussed above with respect to step 8860, or any other inputs from global generic data-presentation variability processing 407 which may used as inputs to these data-presentation processes. The process then returns (step 1340).

The platform specific font manager 418 could store two types of font information for output: mathematical equations for the outline shape of the glyph or the bitmap for the glyph. Alternatively, the platform specific font manager may be an operating system subsystem, which comprises multiple font engines, such TrueType™ font engine 419 or bitmap font engine 420, as shown in FIG. 4. Mathematical equations, including Bezier curvers, would be converted and filled to bitmap data upon the rendering request. In other words, in the preferred embodiment, JVM non-Latin1 Unicode encoded glyph rendering process 410 expects a bitmap to be returned in some manner. The bitmap data can be stored in byte arrays or integer arrays upon return to the JVM. The size, metrics, and other data will typically be accessed using Java Native Interface calls since high-performance is generally required and these font managers or font engines, such as TrueType™, exist only in native code. The interface may be relatively simple as the TrueType™ font engine may only require the Unicode code point and the size of the font to produce the bitmap data.

In producing the AWT Image Class data from the JVM glyph data in the integer array, the data must be padded as there is not a one-to-one mapping of the number of bits to the width X height contained in the bitmap returned from the font manager. Each bit will be expanded into an integer using the color model. The TrueType™ data does not contain color information, so each bit is converted into either a background value (off or transparent) or a foreground value (on). An Image Class is produced as this is a generic representation of the bitmap data within AWT. Once the Image Class is created any JVM AWT-to-printer-language producer could print out the current glyph bitmap. This gives print support of any glyph that is contained in the font.

Figure 14:
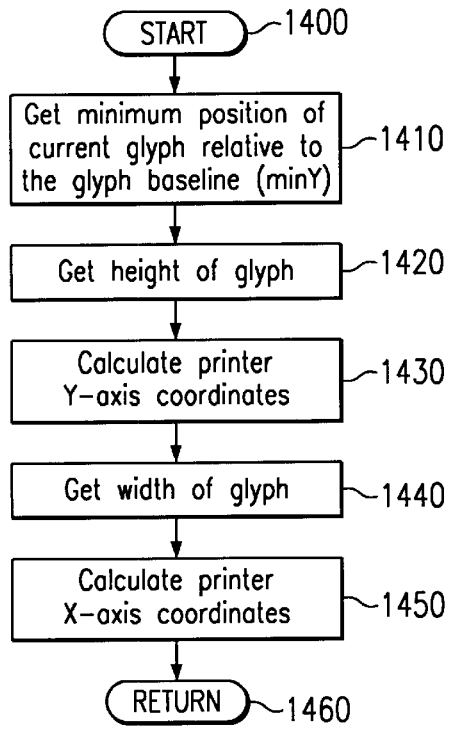
FIG. 14 is a flowchart depicting the positioning of an AWT Image Class in the AWT coordinate system.

With reference now to FIG. 14, the flowchart depicts the positioning of an AWT Image Class in the AWT coordinate system, as mentioned above with respect to step 1140. The process starts (step 1400) by getting the minimum position of the current glyph relative to the glyph baseline (minY) (step 1410) and the height of the glyph (step 1420). The process then calculates the printer Y-axis coordinates where the top-left coordinate in the AWT coordinate space equals the JDK application's current Y value minus minY and the bottom-right coordinate equals the JDK application's current Y value plus the height of the glyph minus minY (step 1430). The process then gets the width of the glyph (step 1440). The process then calculates the printer X-axis coordinate where the top-left coordinate in the AWT coordinate space equals the JDK application's current X value and the bottom-right coordinate equals the JDK application's current X value plus the width of the glyph (step 1450). The process then returns (step 1460). One of ordinary skill in the art would understand that the actual positioning of the AWT Image produced above depends on the particular characteristics of the font model. It should also be noted that the particular glyph values could be scaled values which were produced in accordance with the quality variability processing values, such as the requested font which was previously scaled, discussed above with respect to step 8860.

Figure 15:
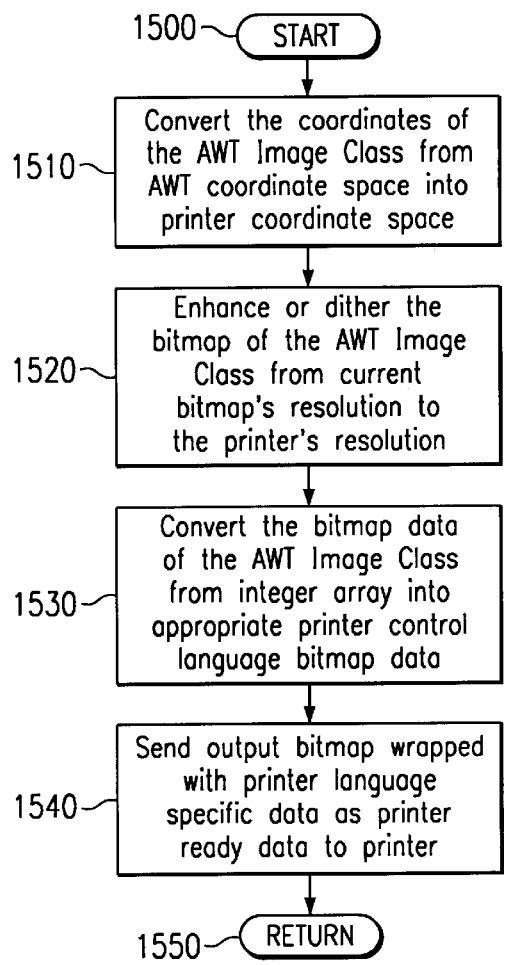
FIG. 15 is a flowchart depicting the printing of an AWT Image Class.

With reference now to FIG. 15, a flowchart depicts the printing of an AWT Image Class, as mentioned above with respect to step 1150. The process starts (step 1500) when the process converts the coordinates of the AWT Image Class from AWT coordinate space into the printer coordinate space (step 1510). The process also enhances or dithers the bitmap of the AWT Image Class from the current bitmap resolution to the printer's resolution (step 1520). The printer's resolution is part of the PrintJob properties that the printer language producer uses to format "printer ready data", and these resolution values are basically static but obtainable. The process then converts the bitmap data of the AWT Image class from the integer array into the appropriate printer control language bitmap data (step 1530). The process then sends the bitmap wrapped with printer language specific data as printer-ready data to an appropriate printing device, either local or attached to a network, through the appropriate invocation of methods in the JVM (step 1540). These steps may be implemented within Producer-AWT-graphics-to-output-device-commands 409. The process then returns (step 1550).

Figure 16:
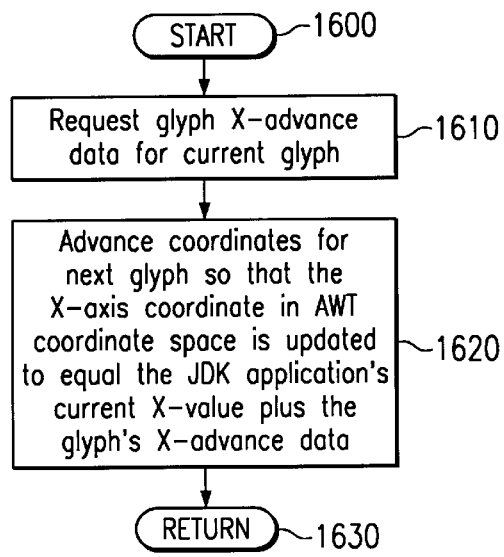
FIG. 16 is a flowchart depicting the advancement of printer coordinates for the next glyph.

With reference now to FIG. 16, a flowchart depicts the advancement of printer coordinates for the next glyph, as mentioned above with respect to step 1160. The process starts (step 1600) when the process requests glyph X-advance data for the current glyph in the current font (step 1610). The X-advance data will be the scaled X-advance value as produced in accordance with the quality variability processing values, such as the requested font, which was previously scaled, discussed above with respect to step 8860. The process then advances to the coordinates for the next glyph so that the X-axis coordinate in the AWT coordinate space is updated to equal the JDK application's current X value plus the current glyph's X-advance data (step 1620). As would be understood to one of ordinary skill in the art, the X-advance data may vary depending on the platform font used, the font manager, character, characteristics, etc. These advance data items may include data such as kerning values that would vary from glyph to glyph. The process then returns (step 1630).

The advantages of the present invention should be evident from the foregoing detailed description. The variability of computer resources is exposed to users or administrators in order to provide the ability to control the speed and quality of data presentation. The choice is exposed globally through the use of standard JVM dialog classes and methods. Large differences in the speed and quality of data-presentation become evident for various requested scaling factors, point sizes, and quality/performance metrics. The user's preference need only be specified once for the choice to be made globally available within the JVM.

This method also simplifies computer operation for some users. For example, in a typical computer environment, one output device may support one subset of Unicode glyphs while another output device supports a different subset of Unicode encoding glyphs. By merely specifying a quality parameter, the user could be implicitly choosing an output device. If a user specifies high quality output of non-Latin1 Unicode encoded glyphs, the method may render the requested glyphs and route the output to a particular device in a particularly way based on the specified quality variability parameters and other associated data. The method also removes many technical terms from the user, such as "non-Latin1 Unicode glyphs" by mapping many different output considerations to a single quality parameter using one generic graphical user interface. This allows provides for lower administration costs in providing user support, etc.

By providing quality variability on a glyph-by-glyph basis, a relatively simple glyph, such as those used for Latin1 characters, may be presented using low quality. However, a more complex glyph which may require a clear presentation of its more intricate detail for a proper comprehension of the glyph, such as various Chinese characters, are presented using high quality. In this manner, computing resources may be preserved or tailored on a glyph-by-glyph basis.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing glyph-based quality variability in data-presentation of a series of glyphs on an output device within a computer system, wherein said series of glyphs comprises two or more glyphs, the method comprising the computer-implemented steps of:

(a) receiving a request for data-presentation of a series of glyphs;

(b) determining, for each glyph in said series of glyphs, whether quality variability is applicable to said each glyph;

(c) if quality variability is not applicable to said each glyph, performing data-presentation of said each glyph on said output device without varying the quality of said each glyph;

(d) if quality variability is applicable to said each glyph, further comprising the steps of:

(e) determining a quality variance to be applied to said each glyph based on predetermined data-presentation variability data; and (f) performing data-presentation of said each glyph on said output device in accordance with said quality variance.

2. The method as recited in claim 1, wherein, in response to said step of receiving said request in step (a)

(a1) if a toggle data value in predetermined data-presentation variability data states that glyph-based quality variability is not applicable for fulfilling said request for data-presentation, performing data-presentation of said each glyph on said output device without varying the quality of said each glyph;

(a2) if a toggle data value in predetermined data-presentation variability data states that glyph-based quality variability is applicable for fulfilling said request for data-presentation, proceeding to said step for determining in step (b) so that data-presentation may be performed on said each glyph.

3. The method as recited in claim 1, wherein said each glyph is specified using an encoding value in the Unicode encoding standard.

4. The method as recited in claim 1, wherein said step of performing data-presentation in steps (c) and (f) occur in data-presentation processes controlled by a virtual machine.

5. The method as recited in claim 4, wherein said predetermined data-presentation variability data is stored as part of a object-oriented class and wherein said data-presentation processes are methods in the virtual machine.

6. The method as recited in claim 5, wherein said virtual machine is a Java virtual machine.

7. The method as recited in claim 1, wherein a physical manner for said step of performing data-presentation comprises displaying or printing.

8. The method as recited in claim 1, wherein said output device is a display device.

9. The method as recited in claim 1, wherein said output device is a printer.

10. The method as recited in claim 1, wherein said step of determining whether quality variability is applicable to said each glyph in step (b) further comprises:

(b1) computing applicability of quality variability for said each glyph based on font metric data for said each glyph.

11. The method as recited in claim 10, further comprising, prior to said step of computing applicability in step (b1), obtaining font metric data for said each glyph.

12. The method as recited in claim 11, wherein said step of determining whether quality variability is applicable to said each glyph in step (b) is performed in a method in a virtual machine and said font metric data is obtained from a host computer.

13. The method as recited in claim 1, wherein said step of determining whether quality variability is applicable to said each glyph in step (b) further comprises:

(b2) computing applicability of quality variability for said each glyph based on operating specifications or device constraints of said output device.

14. The method as recited in claim 13, further comprising, prior to said step of computing applicability in step (b2), obtaining operating specifications or device constraints of said output device.

15. The method as recited in claim 1, wherein said step of determining whether quality variability is applicable to said each glyph in step (b) further comprises:

(b3) computing applicability of quality variability for said each glyph based on a combination of font metric data, operating specifications of said output device, or device constraints of said output device.

16. The method as recited in claim 15, further comprising, prior to said step of computing applicability in step (b3), obtaining font metric data for said each glyph, operating specifications of said output device, or device constraints of said output device.

17. The method as recited in claim 1, wherein the step of determining a quality variance of said each glyph in step (e) further comprises:

(e1) determining said quality variance based on a combination of font metric data, operating specifications of said output device, or device constraints of said output device.

18. The method as recited in claim 1, further comprising, prior to said step of performing data-presentation of said each glyph in step (f):

(f1) applying said quality variance to said each glyph.

19. The method as recited in claim 18, further comprising, prior to said step of applying said quality variance to said each glyph in step (f1), a determination of a computing resource to accomplish said step of applying said quality variance to said each glyph.

20. The method as recited in claim 19, wherein said computing resource for said step of applying said quality variance to said each glyph is hardware in the output device.

21. The method as recited in claim 19, wherein said computing resource for said step of applying said quality variance to said each glyph is software in the output device.

22. The method as recited in claim 19, wherein said computing resource for said step of applying said quality variance to said each glyph is data-presentation processes controlled by a virtual machine.

23. A data processing system for providing glyph-based quality variability in data-presentation of a series of glyphs on an output device, wherein said series of glyphs comprises two or more glyphs, the data processing system comprising:

(a) reception means for receiving a request for data-presentation of a series of glyphs;

(b) determination means determining, for each glyph in said series of glyphs, whether quality variability is applicable to said each glyph;

(c) performance means for performing data-presentation of said each glyph on said output device without varying the quality of said each glyph if quality variability is not applicable to said each glyph;

(d) determination means for determining a quality variance to be applied to said each glyph based on predetermined data-presentation variability data if quality variability is applicable to said each glyph;

(e) performance means for performing data-presentation of said each glyph on said output device in accordance with said quality variance if quality variability is applicable to said each glyph.

24. The data processing system as recited in claim 23 wherein, in response to said receiving said request,
  performance means for performing data-presentation of said each glyph on said output device without varying the quality of said each glyph if a toggle data value in predetermined data-presentation variability data states that glyph-based quality variability is not applicable for fulfilling said request for data-presentation;
  proceeding means for proceeding to a determination of whether quality variability is applicable to said each glyph so that data-presentation may be performed on said each glyph if a toggle data value in predetermined data-presentation variability data states that glyph-based quality variability is applicable for fulfilling said request for data-presentation.

25. The data processing system as recited in claim 23 wherein said each glyph is specified using an encoding value in the Unicode encoding standard.

26. The data processing system as recited in claim 23 wherein said performance means are data-presentation processes controlled by a virtual machine.

27. The data processing system as recited in claim 26 wherein said predetermined data-presentation variability data is stored as part of a object-oriented class and wherein said data-presentation processes are methods in the virtual machine.

28. The data processing system as recited in claim 27 wherein said virtual machine is a Java virtual machine.

29. The data processing system as recited in claim 23 wherein a physical manner for performance of data-presentation comprises displaying or printing.

30. The data processing system as recited in claim 23 wherein said output device is a display device.

31. The data processing system as recited in claim 23 wherein said output device is a printer.

32. The data processing system as recited in claim 23 wherein said determination means for determining whether quality variability is applicable to said each glyph further comprises computation means for computing applicability of quality variability for said each glyph based on font metric data for said each glyph.

33. The data processing system as recited in claim 32 further comprising means for obtaining font metric data for said each glyph.

34. The data processing system as recited in claim 33 wherein said performance means are methods in a virtual machine and said font metric data is obtained from a host computer.

35. The data processing system as recited in claim 23 wherein said determination means for determining whether quality variability is applicable to said each glyph further comprises computation means for computing applicability of quality variability for said each glyph based on operating specifications or device constraints of said output device.

36. The data processing system as recited in claim 35 further comprising means for obtaining operating specifications or device constraints of said output device.

37. The data processing system as recited in claim 23 wherein said determination means for determining whether quality variability is applicable to said each glyph further comprises computation means for computing applicability of quality variability for said each glyph based on a combination of font metric data, operating specifications of said output device, or device constraints of said output device.

38. The data processing system as recited in claim 37 further comprising means for obtaining font metric data for said each glyph, operating specifications of said output device, or device constraints of said output device.

39. The data processing system as recited in claim 23 wherein said determination means for determining a quality variance of said each glyph further comprises determination means for determining said quality variance based on a combination of font metric data, operating specifications of said output device, or device constraints of said output device.

40. The data processing system as recited in claim 23 further comprising application means for applying said quality variance to said each glyph.

41. The data processing system as recited in claim 40 further comprising determination means for determining a computing resource to accomplish the application of said quality variance to said each glyph.

42. The data processing system as recited in claim 41 wherein said computing resource for the application of said quality variance to said each glyph is hardware in the output device.

43. The data processing system as recited in claim 41 wherein said computing resource for the application of said quality variance to said each glyph is software in the output device.

44. The data processing system as recited in claim 41 wherein said computing resource for the application of said quality variance to said each glyph is data-presentation processes controlled by a virtual machine.

45. A computer program product for use with a data processing system for providing glyph-based quality variability in data-presentation of a series of glyphs on an output device, wherein said series of glyphs comprises two or more glyphs, the computer program product comprising:
  a computer usable medium;
  first instructions for receiving a request for data-presentation of a series of glyphs;
  second instructions for determining, for each glyph in said series of glyphs, whether quality variability is applicable to said each glyph;
  third instructions for performing data-presentation of said each glyph on said output device without varying the quality of said each glyph if quality variability is not applicable to said each glyph;
  fourth instructions for determining a quality variance to be applied to said each glyph based on predetermined data-presentation variability data if quality variability is applicable to said each glyph; and
  fifth instructions for performing data-presentation of said each glyph on said output device in accordance with said quality variance if quality variability is applicable to said each glyph.

46. The computer program product as recited in claim 45 wherein, in response to receiving a request for data-presentation of a series of glyphs,
  instructions for performing data-presentation of said each glyph on said output device without varying the quality of said each glyph if a toggle data value in predetermined data-presentation variability data states that glyph-based quality variability is not applicable for fulfilling said request for data-presentation;
  instructions for proceeding to said second instructions for determining whether quality variability is applicable to said each glyph so that data-presentation may be performed on said each glyph if a toggle data value in predetermined data-presentation variability data states that glyph-based quality variability is applicable for fulfilling said request for data-presentation.

47. The computer program product as recited in claim 45 wherein said each glyph is specified using an encoding value in the Unicode encoding standard.

48. The computer program product as recited in claim 45 wherein said third instructions and said fifth instructions for performing data-presentation are data-presentation processes controlled by a virtual machine.

49. The computer program product as recited in claim 48 wherein said predetermined data-presentation variability data is stored as part of a object-oriented class and wherein said data-presentation processes are methods in the virtual machine.

50. The computer program product as recited in claim 49 wherein said virtual machine is a Java virtual machine.

51. The computer program product as recited in claim 45 wherein a physical manner for performing data-presentation comprises displaying or printing.

52. The computer program product as recited in claim 45 wherein said output device is a display device.

53. The computer program product as recited in claim 45 wherein said output device is a printer.

54. The computer program product as recited in claim 45 wherein said second instructions for determining whether quality variability is applicable to said each glyph further comprises instructions for computing applicability of quality variability for said each glyph based on font metric data for said each glyph.

55. The computer program product as recited in claim 54 further comprising instructions for obtaining font metric data for said each glyph.

56. The computer program product as recited in claim 55 wherein said second instructions for determining whether quality variability is applicable to said each glyph are written for execution in a method in a virtual machine and said font metric data is obtained from a host computer.

57. The computer program product as recited in claim 45 wherein said second instructions for determining whether quality variability is applicable to said each glyph further comprises instructions for computing applicability of quality variability for said each glyph based on operating specifications or device constraints of said output device.

58. The computer program product as recited in claim 57 further comprising instructions for obtaining operating specifications or device constraints of said output device.

59. The computer program product as recited in claim 45 wherein said second instructions for determining whether quality variability is applicable to said each glyph further comprises instructions for computing applicability of quality variability for said each glyph based on a combination of font metric data, operating specifications of said output device, or device constraints of said output device.

60. The computer program product as recited in claim 59 further comprising instructions for obtaining font metric data for said each glyph, operating specifications of said output device, or device constraints of said output device.

61. The computer program product as recited in claim 45 wherein said fourth instructions for determining a quality variance of said each glyph further comprises instructions for determining said quality variance based on a combination of font metric data, operating specifications of said output device, or device constraints of said output device.

62. The computer program product as recited in claim 45 further comprising instructions for applying said quality variance to said each glyph prior to performing data-presentation of said each glyph.

63. The computer program product as recited in claim 62 further comprising instructions for determining a computing resource to accomplish the application of said quality variance to said each glyph.

64. The computer program product as recited in claim 63 wherein said computing resource for the application of said quality variance to said each glyph is hardware in the output device.

65. The computer program product as recited in claim 63 wherein said computing resource for the application of said quality variance to said each glyph is software in the output device.

66. The computer program product as recited in claim 63 wherein said computing resource for the application of said quality variance to said each glyph is data-presentation processes controlled by a virtual machine.

* * * * *